(12) United States Patent
Jain et al.

(10) Patent No.: US 9,722,943 B2
(45) Date of Patent: Aug. 1, 2017

(54) SEAMLESS SWITCHING FOR MULTIHOP HYBRID NETWORKS

(71) Applicant: QUALCOMM Incorporated, San Diego, CA (US)

(72) Inventors: Kaustubh Jain, Greenbelt, MD (US); Qi Xue, San Diego, CA (US); Peerapol Tinnakornsrisuphap, San Diego, CA (US); Brian M. Buesker, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 788 days.

(21) Appl. No.: 13/717,111

(22) Filed: Dec. 17, 2012

(65) Prior Publication Data
US 2014/0169383 A1   Jun. 19, 2014

(51) Int. Cl.
| | | |
|---|---|---|
| H04L 12/28 | (2006.01) | |
| H04L 12/863 | (2013.01) | |
| H04L 12/707 | (2013.01) | |
| H04L 12/803 | (2013.01) | |
| H04L 12/833 | (2013.01) | |
| H04L 12/801 | (2013.01) | |
| H04L 1/18 | (2006.01) | |

(52) U.S. Cl.
CPC .......... *H04L 47/6225* (2013.01); *H04L 45/22* (2013.01); *H04L 45/24* (2013.01); *H04L 47/125* (2013.01); *H04L 47/31* (2013.01); *H04L 47/34* (2013.01); *H04L 47/624* (2013.01); *H04L 1/1841* (2013.01)

(58) Field of Classification Search
CPC ......... H04L 12/26; H04L 12/56; H04L 12/46; H04J 3/14; H04J 3/24; H03M 13/05; G06F 11/10; G06F 11/30; H04Q 11/04
See application file for complete search history.

(56) References Cited

U.S. PATENT DOCUMENTS

| | | |
|---|---|---|
| 5,309,433 A | 5/1994 | Cidon et al. |
| 5,627,822 A | 5/1997 | Edmaier et al. |
| 6,370,112 B1 | 4/2002 | Voelker |

(Continued)

FOREIGN PATENT DOCUMENTS

| | | |
|---|---|---|
| CN | 103959698 | 7/2014 |
| EP | 2061211 A1 | 5/2009 |

(Continued)

OTHER PUBLICATIONS

Co-pending U.S. Appl. No. 13/301,562, filed Nov. 21, 2011, 99 pages.

(Continued)

*Primary Examiner* — Bob Phunkulh
(74) *Attorney, Agent, or Firm* — DeLizio Law, PLLC

(57) ABSTRACT

Seamless path switching is made possible in a multi-hop network based upon stream marker packets and additional path distinguishing operations. A device receiving out-of-order packets on the same ingress interface is capable of determining a proper order for the incoming packets having different upstream paths. Packets may be reordered at a relay device or a destination device based upon where a path update is initiated. Reordering packets from the various upstream paths may be dependent upon a type of service associated with the packet.

28 Claims, 9 Drawing Sheets

(56) References Cited

U.S. PATENT DOCUMENTS

| | | | |
|---|---|---|---|
| 6,516,000 B1* | 2/2003 | Kshirsagar et al. | 370/410 |
| 6,567,929 B1 | 5/2003 | Bhagavath et al. | |
| 6,611,942 B1 | 8/2003 | Battistello et al. | |
| 6,947,379 B1* | 9/2005 | Gleichauf et al. | 370/229 |
| 6,977,888 B1 | 12/2005 | Frenger et al. | |
| 7,107,334 B1* | 9/2006 | Shaffer et al. | 709/224 |
| 7,315,898 B2 | 1/2008 | Kohno | |
| 7,372,865 B2 | 5/2008 | Scott et al. | |
| 7,489,866 B2 | 2/2009 | Ozugur et al. | |
| 7,606,263 B1* | 10/2009 | Parker | 370/474 |
| 7,636,342 B2 | 12/2009 | Tang | |
| 7,647,616 B2 | 1/2010 | Puthiyedath | |
| 8,279,870 B2* | 10/2012 | Flammer et al. | 370/392 |
| 8,767,666 B2* | 7/2014 | Cheng et al. | 370/329 |
| 2002/0141344 A1 | 10/2002 | Chidambaran et al. | |
| 2002/0172208 A1 | 11/2002 | Malkamaki | |
| 2003/0120802 A1 | 6/2003 | Kohno | |
| 2003/0210669 A1 | 11/2003 | Vayanos et al. | |
| 2003/0223358 A1* | 12/2003 | Rigby et al. | 370/218 |
| 2004/0078624 A1 | 4/2004 | Maxemchuk et al. | |
| 2005/0240677 A1 | 10/2005 | Liu et al. | |
| 2007/0110074 A1 | 5/2007 | Bradley et al. | |
| 2007/0160017 A1 | 7/2007 | Meier et al. | |
| 2007/0286140 A1* | 12/2007 | Kwon | 370/338 |
| 2007/0291778 A1 | 12/2007 | Huang et al. | |
| 2008/0025309 A1 | 1/2008 | Swallow | |
| 2008/0060074 A1* | 3/2008 | Okuyama | 726/23 |
| 2008/0072113 A1 | 3/2008 | Tsang et al. | |
| 2008/0094520 A1 | 4/2008 | Tkachenko et al. | |
| 2008/0219204 A1 | 9/2008 | Lee et al. | |
| 2008/0227403 A1* | 9/2008 | Taki | 455/68 |
| 2008/0279567 A1* | 11/2008 | Huang et al. | 398/168 |
| 2009/0016366 A1* | 1/2009 | Endo et al. | 370/401 |
| 2009/0059928 A1 | 3/2009 | Enomoto et al. | |
| 2009/0213779 A1 | 8/2009 | Zhang et al. | |
| 2010/0046520 A1 | 2/2010 | Nakata | |
| 2010/0183024 A1 | 7/2010 | Gupta | |
| 2010/0226265 A1 | 9/2010 | Zhang et al. | |
| 2010/0257421 A1 | 10/2010 | Kohno et al. | |
| 2010/0296450 A1* | 11/2010 | Faniuolo et al. | 370/328 |
| 2010/0309777 A1* | 12/2010 | Kano | 370/218 |
| 2011/0080911 A1* | 4/2011 | Guichard et al. | 370/392 |
| 2011/0235638 A1 | 9/2011 | Tempia Bonda | |
| 2011/0286326 A1* | 11/2011 | Awano | 370/225 |
| 2012/0063319 A1 | 3/2012 | Christin et al. | |
| 2012/0071168 A1 | 3/2012 | Tomici et al. | |
| 2012/0131408 A1* | 5/2012 | Tada et al. | 714/752 |
| 2012/0155256 A1* | 6/2012 | Pope et al. | 370/230 |
| 2012/0173748 A1 | 7/2012 | Bouazizi | |
| 2012/0188873 A1 | 7/2012 | Nakatsugawa | |
| 2012/0192026 A1 | 7/2012 | Chen et al. | |
| 2012/0207164 A1 | 8/2012 | Tanaka | |
| 2012/0224503 A1 | 9/2012 | Schrum, Jr. et al. | |
| 2012/0236870 A1 | 9/2012 | Klein | |
| 2012/0263182 A1 | 10/2012 | Enomoto et al. | |
| 2012/0307748 A1* | 12/2012 | Cheng et al. | 370/329 |
| 2013/0128738 A1* | 5/2013 | Cohen et al. | 370/235 |
| 2013/0132603 A1* | 5/2013 | Cohen et al. | 709/231 |
| 2013/0132604 A1* | 5/2013 | Cohen et al. | 709/231 |
| 2013/0329546 A1* | 12/2013 | Wijnands | 370/218 |
| 2013/0329752 A1 | 12/2013 | Beheydt et al. | |
| 2014/0023022 A1* | 1/2014 | Cheng et al. | 370/329 |

FOREIGN PATENT DOCUMENTS

| | | |
|---|---|---|
| JP | 01258518 | 10/1989 |
| JP | 2003273902 | 9/2003 |
| JP | 2015502711 | 1/2015 |
| KR | 1020140097417 | 8/2014 |
| WO | 2009005162 A2 | 1/2009 |
| WO | 2009074840 | 6/2009 |
| WO | 2013078226 | 5/2013 |
| WO | 2014099257 | 6/2014 |

OTHER PUBLICATIONS

Culley Hewlett-Packard Company U Elzur Broadcom Corporation R Recio IBM Corporation S Bailey Sandburst Corporation J Carrier Cray: "Marker PDU Aligned Framing for TCP Specification; draft-ietf-rddp-mpa-08.txt", Oct. 7, 2006, vol. rddp, No. 8, Oct. 7, 2006 (Oct. 7, 2006), XP015048063, ISSN: 9999-9004 the whole document.

International Search Report and Written Opinion—PCT/US2012/066105—ISA/EPO—Mar. 27, 2013.

PCT Application No. PCT/US2012/066105 International Preliminary Report on Patentability, Jan. 31, 2014, 9 pages.

PCT Application No. PCT/US2013/071406 International Search Report and Written Opinion, Feb. 26, 2014, 13 pages.

Finn, "Marker Protocol and DRNI", axbq-nfinn-marker-protocol-drni-0511-v1; IEEE Draft, vol. 802.1, No. v1, May 9, 2011, 1-15.

Kitatsuji, et al., "On Handover Procedure with Data Forwarding for Reducing Buffered User Data in Base Stations", Global Telecommunications Conference, 2009. Globecom 2009. IEEE, Nov. 30, 2009 IEEE, Piscataway, NJ, USA—ISBN 978-1-4244-4148-8 ; ISBN 1-4244-4148-X, Nov. 30, 2009, pp. 1-8.

"PCT Application No. PCT/US2012/066105, Written Opinion of the IPEA", Oct. 17, 2013 , 5 pages.

"U.S. Appl. No. 13/301,562 Final Office Action", Oct. 21, 2013 , 32 pages.

"Taiwan Application No. 102142684 TIPO Search Report", Jan. 9, 2015, 1 page.

"Taiwan Application No. 102142684, Office Action", Jan. 12, 2015, 14 pages.

"U.S. Appl. No. 13/301,562 Office Action", Apr. 15, 2015, 25 pages.

"Japanese Patent Application No. 2014-542573, Office Action", Jun. 30, 2015, 8 pages.

"U.S. Appl. No. 13/301,562 Final Office Action", Nov. 4, 2015, 28 pages.

"Japanese Application No. 2014-542573, Final Office Action", Dec. 1, 2015, 4 pages.

"Korean Application No. 10-2014-7016864 Office Action", Sep. 27, 2016, 8 pages.

\* cited by examiner

SEAMLESS SWITCHING FOR MULTIHOP HYBRID NETWORKS

BACKGROUND

Embodiments of the inventive subject matter generally relate to the field of computer systems, and, more particularly, to transmitting and receiving streams in a multi-hop hybrid network.

A hybrid network (such as a Convergent Digital Home Network (CDHN), or P1905.1 network) is typically formed by interconnecting communication networks across different network technologies and communication media. The hybrid network may include hybrid communication devices (referred to herein as "hybrid devices") that are often multi-interface and capable of operating across multiple networking technologies. A hybrid device (HD) may or may not have multiple interfaces but is considered a hybrid device if it is configured to use protocols associated with multi-interface devices in a hybrid network. For example, each hybrid device may support multiple interfaces using different network technologies (e.g., Ethernet, IEEE 802.11 WLAN, Coax, and powerline communications (PLC), etc.). In a hybrid network with multiple hybrid devices, there may exist a plurality of different paths from a source hybrid device to a destination hybrid device. Occasionally, a path associated with a packet stream may be changed by one or more of the hybrid devices. When path changes occur, there is a potential for out-of-order packet delivery at a destination hybrid device due to packets transmitted via a first path arriving after packets transmitted via a new, second path.

SUMMARY

Various embodiments are disclosed of a multi-hop hybrid network that may utilize stream marker packets and/or additional path distinguishing information to properly order packets received out-of-order due to a path update. A device receiving out-of-order packets on the same ingress interface is capable of determining a proper order for the incoming packets having different upstream paths.

In one embodiment, a first packet associated with a packet stream is received at a first ingress interface. A second packet associated with the packet stream is received at the same first ingress interface. The first packet is associated with a previous path used before a path update and the second packet is associated with an updated path used after the path update. In one embodiment, for each received packet, it is determined whether the received packet is associated with the previous path or the updated path. The first packet and the second packet are processed in the order they were transmitted. In one embodiment, the second packet is received before the first packet. The second packet associated with the updated path may be buffered until the first packet associated with the previous path is processed.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
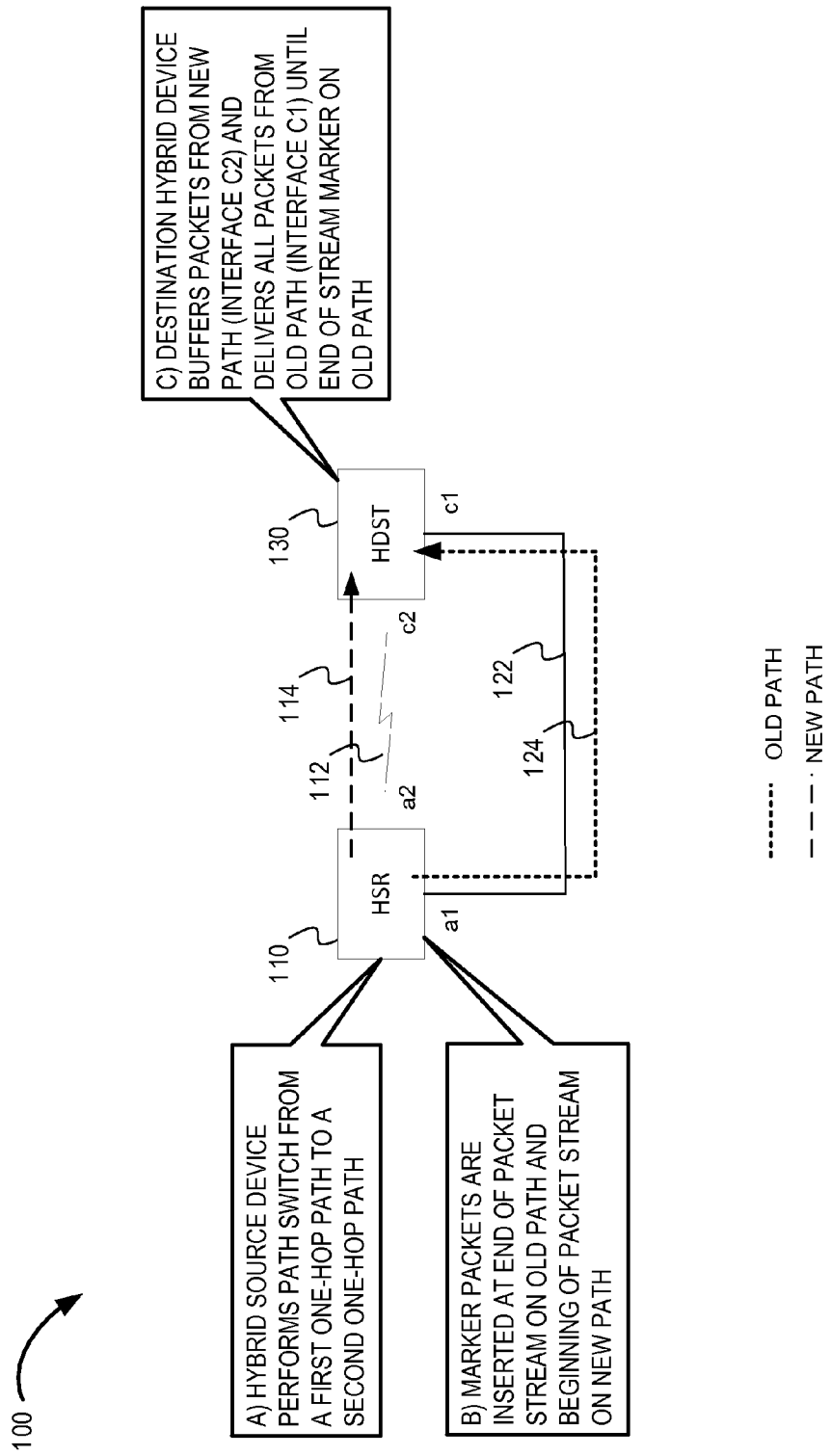
FIG. 1 is an example system diagram illustrating a path update and process for packet reordering in a one-hop hybrid network.

The description that follows includes exemplary systems, methods, techniques, instruction sequences and computer program products that embody techniques of the present inventive subject matter. However, it is understood that the described embodiments may be practiced without these specific details. For instance, although examples refer to two-hop paths in a hybrid network, the descriptions herein equally could be applied to hybrid networks with more than two hybrid hops. In other instances, well-known instruction instances, protocols, structures and techniques have not been shown in detail in order not to obfuscate the description.

Recently, hybrid networks have evolved to allow for multi-hop paths from a source device to a destination device. In this disclosure, a hop is defined as a communication in a hybrid network from a first device to a second device via the same communication media and network segment without being bridged by a third device. Typically a communication from a first device to a second device that traverses different communication media, network segment, or via a third (relay) device is considered to include more than one hop. Several example hops described in this document refer to hops between hybrid devices; as such a hop may also be referred to as a hybrid hop interchangeably. A multi-hop path is defined as a path that includes two or more hops through the hybrid network. The multi-hop paths can be computed at each hybrid device in the path based on topology mapping information and link metric information shared between the hybrid devices.

Hybrid devices (e.g. a hybrid source device, hybrid relay device, or hybrid destination device) described in this disclosure may be IEEE 1905.1 compliant. IEEE P1905.1 draft standard defines an abstraction layer (AL) for multiple home network technologies that provides a common interface to several popular network technologies: IEEE 1901 over power lines, IEEE 802.11 for wireless, Ethernet over twisted pair cable and MoCA 1.1 over coax. In this disclosure, a hybrid device is considered P1905.1 compliant if it includes the IEEE P1905.1 abstraction layer and associated protocols. The abstraction layer typically has a unique medium access control (MAC) address that is in addition to the interface layer (IL) MAC addresses associated with each interface of the HD. While some embodiments are described as features performed at an abstraction layer or using an abstraction layer MAC address, it should be understood that other embodiments may be possible which are not performed at an abstraction layer or without using an abstraction layer MAC address.

In an example topology, a path may be limited to two-hop paths that includes a first hybrid hop from a source hybrid device (HSR) to a relay hybrid device (HRL) and a second hybrid hop from the relay hybrid device to a destination hybrid device (HDST). It should be understood that the two-hop path represents a path having two hybrid hops through the hybrid network, while there may be legacy networks or legacy devices connected via hybrid devices. Furthermore, in the interest of brevity, this disclosure will focus on one-hop and two-hop hybrid paths. It should be understood that any number of hybrid hops may be used in some embodiments.

Occasionally, a path for an active packet stream may need to be updated (e.g. to handle link failures or for load-balancing.) During the path update of a packet stream, the packets of the stream may travel through different paths to reach the destination hybrid device. As a result, packets from the source hybrid device may be received out-of-order at the destination hybrid device.

In some embodiments, stream marker packets are used with additional path distinguishing characteristics such that a hybrid device receiving out-of-order packets on the same ingress interface is capable of determining a proper order for the packets. In some embodiments, packet reordering is accomplished using one or more techniques to identify packets as belonging to a first path or a second path even if the packets are received out-of-order at the same ingress interface.

FIG. 1 is an example system diagram illustrating a path update and packet reordering process in an example one-hop hybrid network 100. In previous hybrid networks, only one-hop paths were allowed. As such, packet order correction was based upon single-hop paths through the hybrid network. In FIG. 1, a source hybrid device (HSR) 110 has a first interface a1 coupled to a first network 122. The source hybrid device 110 also has a second interface a2 coupled via wireless local area network (WLAN, such as Wi-Fi™ or IEEE 802.11) 112 to a WLAN interface c2 of destination hybrid device (HDST) 130. The HDST 130 also has an interface c1 coupled to the first network 122. FIG. 1 is provided as an example of one-hop paths. In FIG. 1, the HSR 110 is communicating via a first path 124 over the first network 122 to the HDST 130. The first path 124 is labeled as an "old path" because the HSR 110 has recently selected a new path 114 over the WLAN connection. At stage A, the HSR 110 performs a path update (e.g. path reselection) resulting in a decision to switch from the old path 124 to the new path 114.

At stage B, upon selecting the new path 114 to the HDST 130, the HSR 110 may insert marker packets. In FIG. 1, packets associated with the old path 124 may be received at the HDST 130 via a powerline communication (PLC) ingress interface c1. Packets associated with the new path 114 may be received at the HDST 130 via a WLAN ingress interface c2. Stream marker packets sent via the old path 124 and the new path 114 can be used by the HDST 130 to ensure that packets from the old path 124 are received and processed prior to processing packets for the new path 114—even if the packets for the new path 114 are received earlier in time.

The marker solution is introduced to support reordering of packets received via two different paths (sometimes referred to as seamless path switching). In one embodiment, the HSR 110 performing a path update will insert an "end-of-stream" marker packet (e.g. "$M_{s,e}$") as the last packet sent on the old path 124. The HSR 110 will also insert a "beginning-of-stream" marker packet (e.g. "$M_{s,b}$") as the first packet sent on the new path 114.

At stage C, the HDST 130 receives packets for the packet stream via both the interfaces c1, c2. In some implementations, a buffer at the HDST 130 may buffer packets received via the new path 114 until all packets from the old path 124 are received and processed. In this disclosure, processing packets may include, for example, sending packets to a higher layer of a protocol stack at the HDST 130, or may include forwarding, retransmitting, or otherwise delivering the packets to a further device. The end-of-stream marker packet received via the old path 124 (on ingress interface c1) indicates to the HDST 130 that the buffered packets associated with the new path 114 may then be processed (since all the packets from the old path 124 have been received and processed).

In FIG. 1, the HDST 130 could distinguish packets received via the new path 114 from packets received via the old path 124 based upon which ingress interface c1, c2 received the packet. In multi-hop hybrid networks, it may not be possible to distinguish packets for an old path and a new path because they may be received via the same ingress interface at the HDST, as shown in FIG. 2.

Figure 2:
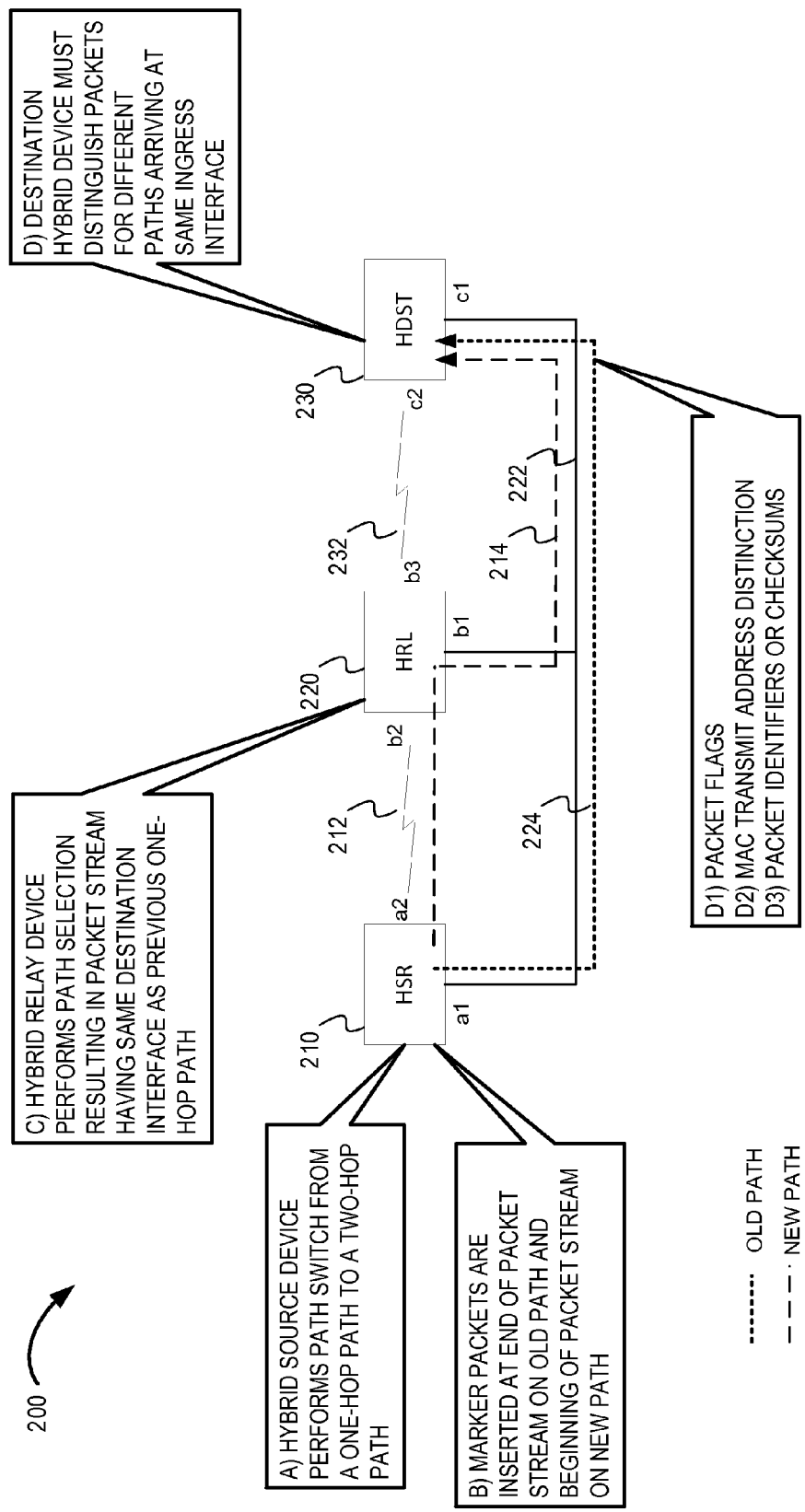
FIG. 2 is an example system diagram illustrating a path update and example operations for packet reordering in a multi-hop hybrid network.

FIG. 2 is an example system diagram illustrating a path update and example operations for packet reordering in a multi-hop hybrid network. In FIG. 2, a source hybrid device ("HSR") 210 is coupled to a network 222. A relay hybrid device ("HRL") 220 and a destination hybrid device ("HDST") 230 are also coupled to the network 222. There exists network connection (shown as a wireless connection) 212 between the HSR 210 and the HRL 220. There also exists a network connection (also shown as wireless) 232 between the HRL 220 and the HDST 230. It should be understood that terms "source," "relay," and "destination" are used only for examples and any of hybrid devices 210, 220, 230 could be a source hybrid device for other communications (not depicted).

In FIG. 2, a first path (also referred to as "previous path" or "old path") 224 includes a one hop path from the HSR 210 via network 222 to the HDST 230. At stage A, upon performing a path update at the HSR 210, a second path (also referred to as "updated path" or "new path") 214 is selected. At stage B, the HSR 210 may insert stream marker packets at the end of the stream on the old path 224 and at the beginning of the stream on the new path 214, as described above.

The new path 214 is a two hop path from the HSR 210 via connection 212 to the HRL 220, which in turn relays the packets for the new path 214 via network 222 in the second hop from the HRL 220 to the HDST 230. It is noted, that while the HSR 210 may anticipate the link that a HRL 220 will use for the second hop of the end-to-end path, the HRL 220 is configured to select the next hop autonomously. At stage C, the HRL 220 relays the incoming packets for the new path 214 by forwarding them to the HDST 230 via the network 222.

The HDST 230 receives the stream marker packets both on the same interface c1 of the HDST 230. Because all the incoming packets (for the stream on the old path and the stream on the new path) are received by the HDST 230 at the same ingress interface (c1), the HDST 230 may be unable to determine which incoming packets are associated with the first path and which incoming packets are associated with the second path. Therefore, the HDST 230 may receive incoming packets out of order and be unable to distinguish which incoming packets are associated with the new path 214 for buffering until the end-of-stream marker packet is received for packets associated with the old path 224.

At stage D, to ensure packet reordering is done properly, it may be desirable for the HDST 230 to distinguish packets associated with the different paths even though they may arrive at the same ingress interface of the HDST 230. It should be noted that the scenario in FIG. 2 is simply an illustrative example. Other path scenarios may occur in a multi-hop hybrid network which result in out-of-order delivery at the same ingress interface of a hybrid device. For example, out-of-order delivery may occur at a relay hybrid device or destination hybrid device.

As an example, the HSR 210 may transmit a first packet via a previous path (such as old path 224) and then a second packet via an updated path (such as path 214). Even though the HSR 210 transmitted the first packet earlier in time than the second packet, the first and second packets may be received at the same ingress interface of the HDST 230 in a different order. For example, the second packet may be received before the first packet. In accordance with this disclosure, the HDST 230 may, for each received packet, determine whether the received packet is associated with the previous path or the updated path. The HDST 230 may process the first packet and the second packet in the order they were transmitted (regardless of the order in which they are received). For example, the HDST 230 may buffer the second packet associated with the updated path until the first packet associated with the previous path is processed. In some embodiments, the processing of the first packet and the second packet in the order they were transmitted may be performed at a lower layer of a protocol stack than a transport layer. For example, the processing of the first and second packets, in order, may be performed by a media access control (MAC) protocol layer of an Open Systems Interconnect (OSI) protocol stack.

In this disclosure, several ways are described in which a hybrid device receiving packets associated with two different paths may determine whether each received packet is associated with a first path in the hybrid network or associated with a second path in the hybrid network. In one embodiment, the stream marker packets may be modified to include additional control or signaling (such as path switch identifiers or packet identification information) that a receiving hybrid device can utilize to reconstruct the correct packet order. In another embodiment, packets of the stream may be modified to include a flag such that the receiving hybrid device can detect the flag to distinguish between a first upstream path and a second upstream path. Distinguishing the upstream path, along with the stream marker packets, allows the receiving hybrid device to reconstruct the correct packet order. In yet another embodiment, the packets are not modified but a receiving hybrid device utilizes information from a media access control (MAC) protocol layer to distinguish between the two upstream paths.

At example stage D1, a new-path-flag may be added to packets that are transmitted via the new path. At example stage D2, the HDST 230 may inspect the MAC layer transmit address (TA) to determine which upstream interface sent the MAC protocol data unit (PDU). For example, packets for the old path 224 would have interface a1 of the HSR 210 as the TA. Packets for the new path 214 would have the interface b1 of HRL 220 as the TA. In another example, at stage D3, additional fields in the stream marker packet (or additional marker packet(s)) may include packet identifiers, such as checksums or other packet identifying information which allows the HDST 230 to determine which packets are associated with either the old path or the new path. Further examples of these packet path distinguishing techniques are described in FIG. 5.

Figure 3:
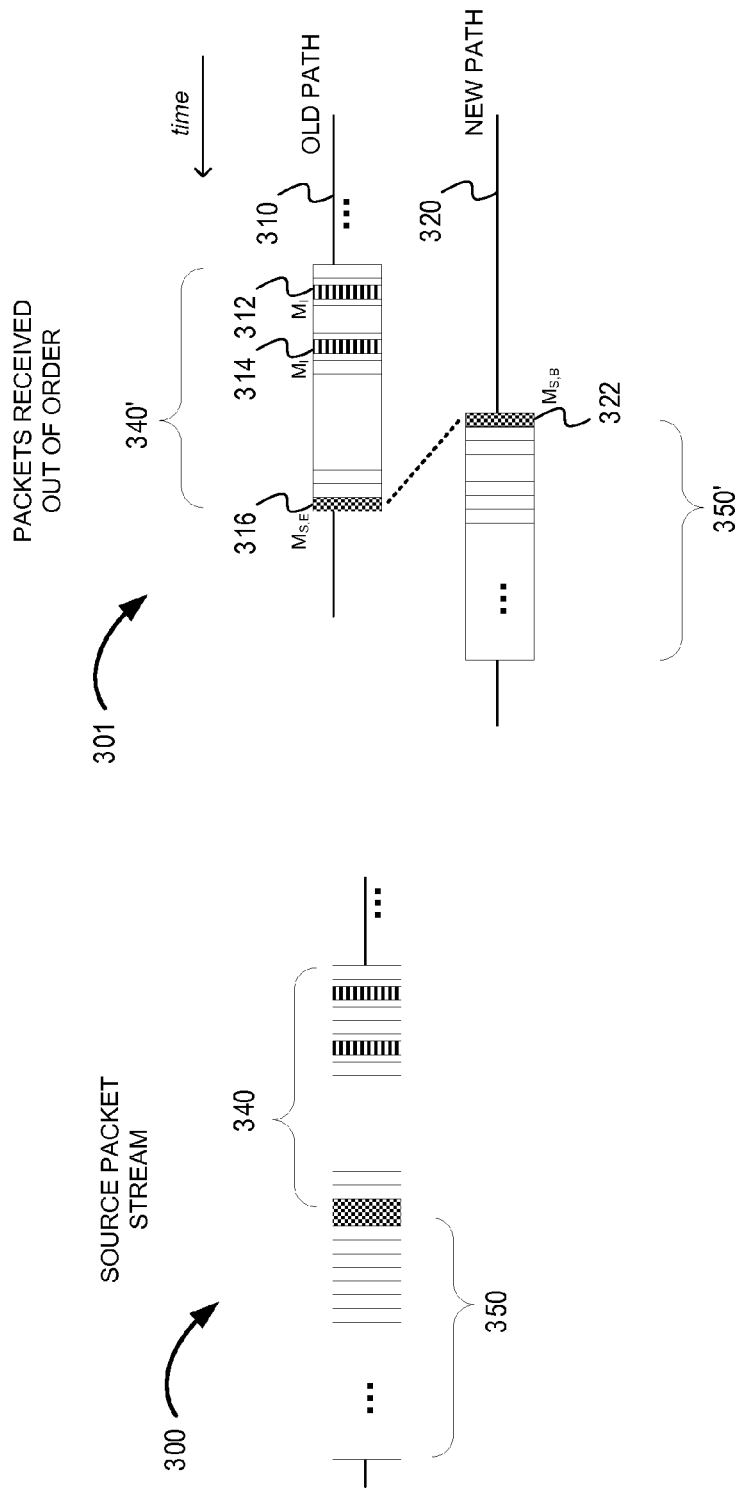
FIG. 3 is a packet timing diagram illustrating packet out-of-order handling using path switch marker packets.

FIG. 3 is a packet timing diagram illustrating out-of-order packet handling using path switch marker packets. In FIG. 3, packet stream 300 is depicted. The packet stream 300 is made up of at least a first plurality of sequential packets 340 and a second plurality of sequential packets 350. As shown in the source packet stream 300, the first plurality of sequential packets 340 is sequentially prior in time to the second plurality of sequential packets 350. However, the first plurality of sequential packets 340 are transmitted via a first path ("old path") 310 and the second plurality of sequential packets 350 are transmitted via a second path ("new path") 320.

In FIG. 3, a timing diagram 301 illustrates how the first plurality of sequential packets are received (shown as 340') and the second plurality of sequential packets are received (350'). It is noted, that generally, packets transmitted sequentially in a path will arrive at the destination in the same sequence as transmitted. However, when there are two paths, the two substreams may arrive with varying delays with regard to each other. Beginning with the first marker packet 312, then second marker packet 314, the receiving device may receive part of the first plurality of sequential packets 340'. The first and second marker packets 312, 314 may be periodically inserted in the packet stream and are used here for illustrative purposes Next, the receiver may receive the beginning-of-stream $M_{S,B}$ marker packet 322. It is noted that the $M_{S,B}$ marker packet 322 may be received before the end-of-stream $M_{S,E}$ marker packet 316 associated with the last packet of the old path 310. Therefore, beginning with the $M_{S,B}$ marker packet 322 associated with the new path 320, the receiving device may buffer packets associated with the new path 320. Meanwhile, the receiving device will continue to process packets received via the old path until detecting the $M_{S,E}$ marker packet 312 or until expiry of a configurable timeout time period. As noted in FIG. 2, the receiving device may be configured to distinguish which packets are associated with the old path from those packets associated with the new path.

Figure 4:
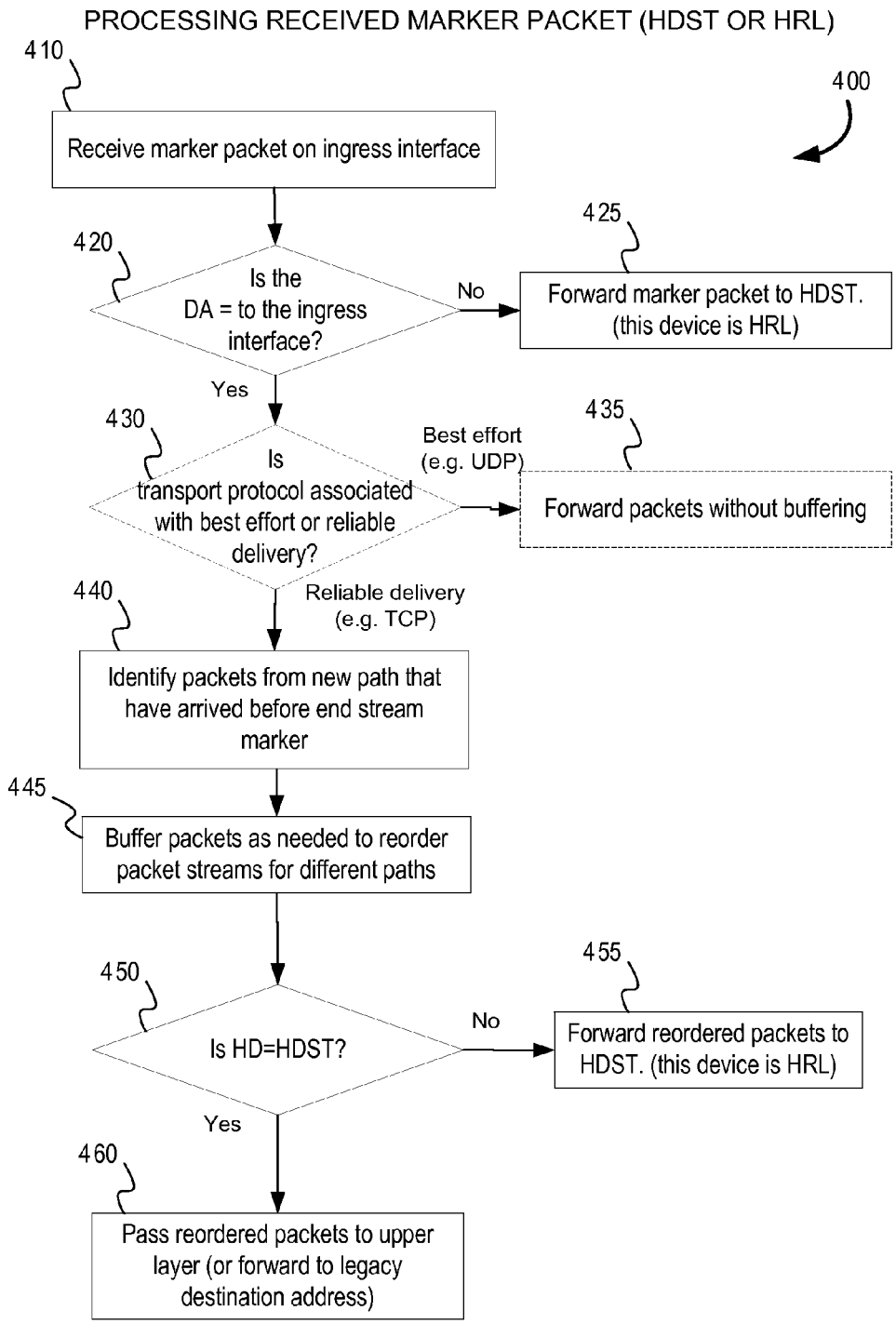
FIG. 4 is a flow diagram illustrating example operations for processing a received path switch marker packet in a multi-hop hybrid network.

FIG. 4 is a flow diagram illustrating example operations for processing a received path switch marker packet in a multi-hop hybrid network. The operations described in FIG. 4 may be performed, for example, by destination hybrid device or a relay hybrid device configured to process stream marker packets received on an ingress interface. At 410, a stream marker packet is received on an ingress interface. At 420, the hybrid device determines whether the destination address of the stream marker packet is the abstraction layer MAC address associated with the hybrid device. If the destination address is not associated with the hybrid device, then at 425, the hybrid device forwards the stream marker packet (and any other incoming packets similarly addressed) to the next hop destination hybrid device. If the destination address for the incoming stream marker packet is associated with the hybrid device, then the process continues to optional decision at 430. At 430, the hybrid device may determine a service protocol associated with the incoming packet(s). If the service protocol is associated with a best effort transport protocol (such as Uniform Datagram Protocol (UDP)), then the hybrid device may be configured to immediately process the packets regardless of potential out-of-order delivery problems. For best effort delivery, out-of-order delivery may be less important than minimizing delay associated with applications that use best effort delivery. If the traffic is associated with a reliable delivery transport protocol (such as Transport Control Protocol (TCP)), or if optional decision 430 is not implemented, then the process continues to block 440. At block 440, packets are identified as belonging to a new path or an old path. If packets for the new path have been received before receiving the end-of-stream marker for the old path, then the packets for the new path are buffered at block 445.

At 450-460, the reordered packets are processed. For example, at 450 the packets are inspected to determine if the hybrid device is the destination hybrid device associated with the destination address of the packet stream. If so, at 460, the destination hybrid device processes the reordered packets, e.g., the destination hybrid device passes the reordered packet stream to higher layers, or alternatively forwards the packet stream to a legacy destination address associated with a legacy network coupled to the destination hybrid device. At 450, if the hybrid device is not the destination hybrid device for the packet stream, then the hybrid device forwards the reordered packet stream to the destination hybrid device at 455. It should be noted that the destination address of the stream marker packet is not necessarily the destination address of the packet stream. For example, this hybrid device may be a relay hybrid device or may be a destination hybrid device coupled to a destination legacy device. This device may perform reordering prior to forwarding the packets to the next hop destination.

In 420/425, if the destination address of the stream marker packet doesn't match the abstraction layer MAC address associated with the hybrid device, then this device is a relay hybrid device that will not perform reordering. Instead, the relay hybrid device may forward the stream marker packets and any packets for the packet stream to the next hop destination for the path.

Figure 5:
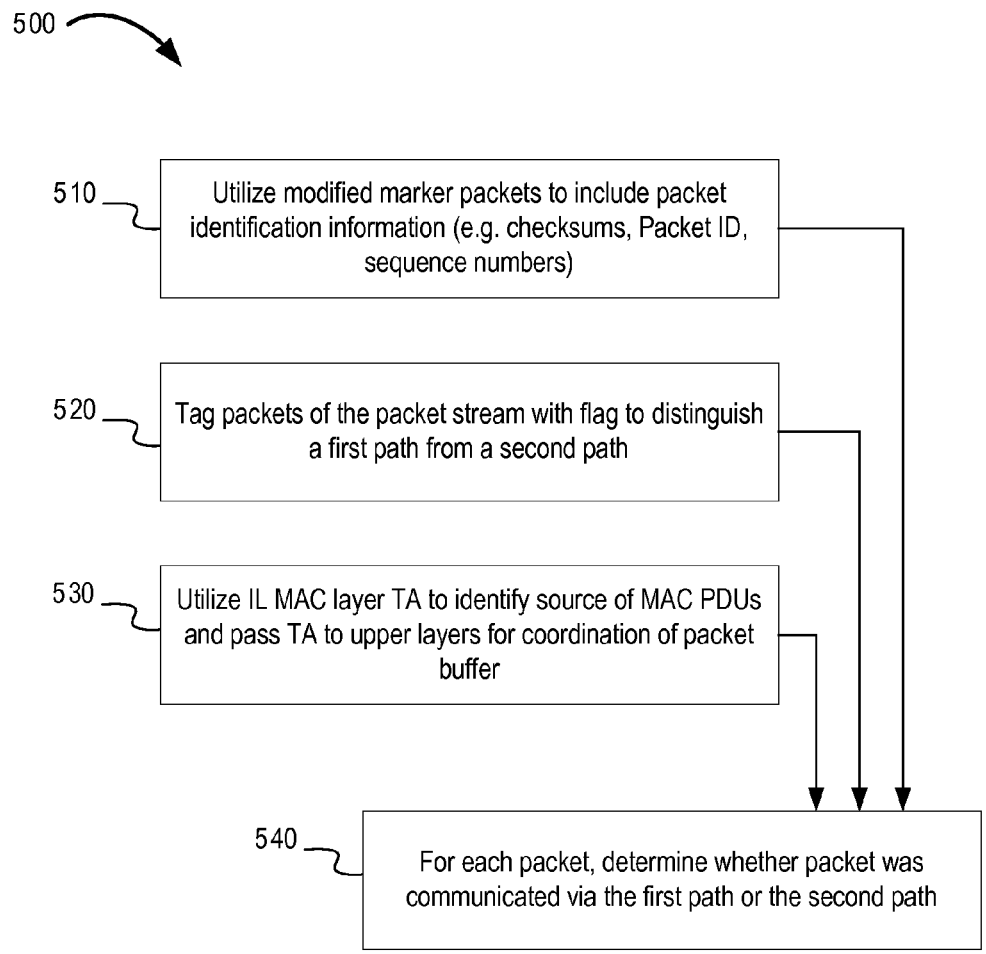
FIG. 5 is a flow diagram illustrating example operations for distinguishing an upstream path for incoming packets in a multi-hop hybrid network.

FIG. 5 is a flow diagram illustrating example operations 500 for distinguishing an upstream path for incoming packets in a multi-hop hybrid network. It should be understood that the following example operations are non-exclusive and may be combined in some implementations. Other example operations may be conceived in accordance with this disclosure for identifying packets of a first path from packets of a second path. Each of the example mechanisms may be used at 540 to determine, for each packet, whether the packet was communicated via the first path or the second path.

At 510, one example operation involves modifying stream marker packets to include packet identification information. The modified stream marker packets may include additional information that a receiving hybrid device may utilize to correct packet order. For example, the marker packet may identify the hybrid device that is performing the path update. This can be used by the downstream hybrid device to determine which device(s) have performed a path update. In the event that two upstream hybrid devices have modified the path, then a downstream hybrid device may correct the order of packets received from two or more different upstream paths.

Alternatively, the hybrid device that is performing the path update may send packet identification information in an end-of-stream marker packet as the last packet in the old path. For example, the source hybrid device may maintain a list of checksums (e.g. layer 4 checksums) for packets transmitted on the old path (e.g. a circular queue with the checksums for the previous N packets transmitted). When a path update is performed, an end-of-stream marker packet is sent on the old path and a beginning-of-stream marker packet is sent on the new path. Either the end-of-stream marker or the beginning-of-stream marker packet could be modified to include the checksums for the previous N packets sent on the old path. At the destination hybrid device, the checksums are used to determine which received packets are associated with the old path. The receiving destination hybrid device may buffer received packets until packets having the checksums included in the marker packet have been identified and processed.

In one embodiment, the checksums may indicate the order of transmission of the previous N packets sent on an old path. As such, the checksums may also serve to verify sequencing of received packets. In some embodiments, the sequence of checksums may be reviewed to properly identify packets for the old path. For example, when two received packets have the same checksum, but only one of them is received in the proper sequence compared to the ordered list of checksums, the one in sequence may belong to the packets indicated by the checksums. In some networks, it is assumed that plurality of sequential packets may be transmitted in order at a first hop and will be received in the same order at the receiving hybrid device as long as they follow the same path. Therefore, the checksums may be used to identify packets previously transmitted in the old path so that those packets are processed sequentially prior to any packets associated with the new path. If any packets associated with the new path are received prior to all of the packets associated with the checksums, they may be buffered at the receiving hybrid device.

As an alternative to the checksums, it may be possible to utilize a Packet ID associated with IP headers so long as the packet ID is unique for each IP packet within the last N packets in the given stream. Sequence numbers may also be utilized to identify a sequence of packets at a higher layer. If the source hybrid device maintains a list of Packet IDs or sequence numbers for transmitted packets, the list of Packet IDs or sequence numbers may be transmitted in a marker packet so that a destination hybrid device can identify and process the packets associated with the old path prior to the packets associated with the new path.

As a further example, the packet identification information may be based upon a function of the transmitted packets. For example, a hash function or other calculation could be performed to generate identifying information about the packets. A person of skill in the art will readily conceive of a variety of packet identification information that may be based upon functions or calculations using some or all of the packet as a variable input.

At 520, another example operation involves modifying packets in the stream such that a receiving hybrid device may determine whether a received packet is associated with an old path or a new path. For example, a first plurality of sequential packets may be sent in the old path. Upon a path update, a second plurality of sequential packets (which are sequentially after the first plurality of sequential packets) may be modified to include a flag or identifier which is associated with the path update. For example, the flag may be a "new-path-packet" flag added to each of the packets sent in the new path for some period of time or quantity of packets. The new-path-packet flag may be a binary flag which can be toggled each time a path update is performed. In other implementations, the flag may be a data field with an identifier for each path. In other implementations, the new path flag may be overloaded in an existing MAC header, such as a VLAN tag field. A receiving hybrid device receiving a marker packet is aware that a path update has been initiated and may buffer packets with the new-pathpacket flag until another marker packet is received indicating that the path update has completed.

At 530, another example operation involves determining whether packets are associated with an old path or a new path based upon MAC PDU. A receiving hybrid device may determine whether a received packet is associated with an old path or a new path based upon coordination in the protocol stack of the receiving hybrid device. Considering the example in FIG. 2, the destination hybrid device will receive the packets for the old path and the new path via the same ingress interface. However, the interface layer (IL) media access control (MAC) protocol data unit (PDU) is based upon the link MAC transmission. Therefore, the MAC PDU typically would include a transmit address (TA) and a receive address (RA) for each MAC PDU sent to the destination hybrid device. In FIG. 2, the MAC PDUs received from the old path may come from the source hybrid device, so the TA may be the interface layer MAC address of the source hybrid device. The MAC PDUs received from the new path may come from the hybrid relay device, so the TA may be the interface layer MAC address of the hybrid relay device. In an embodiment of this disclosure, the TA information is gathered at the interface layer for the current intermediate hop, and provided to the abstraction layer (AL) so that the AL MAC can identify packets associated with the new path. It is noted, that while this approach can slightly change the protocol stack so that lower layer protocol information may be shared with a higher layer protocol, this approach may be utilized in some hybrid networks that are unable to modify the marker packets or packets associated with the packet stream.

Figure 6:
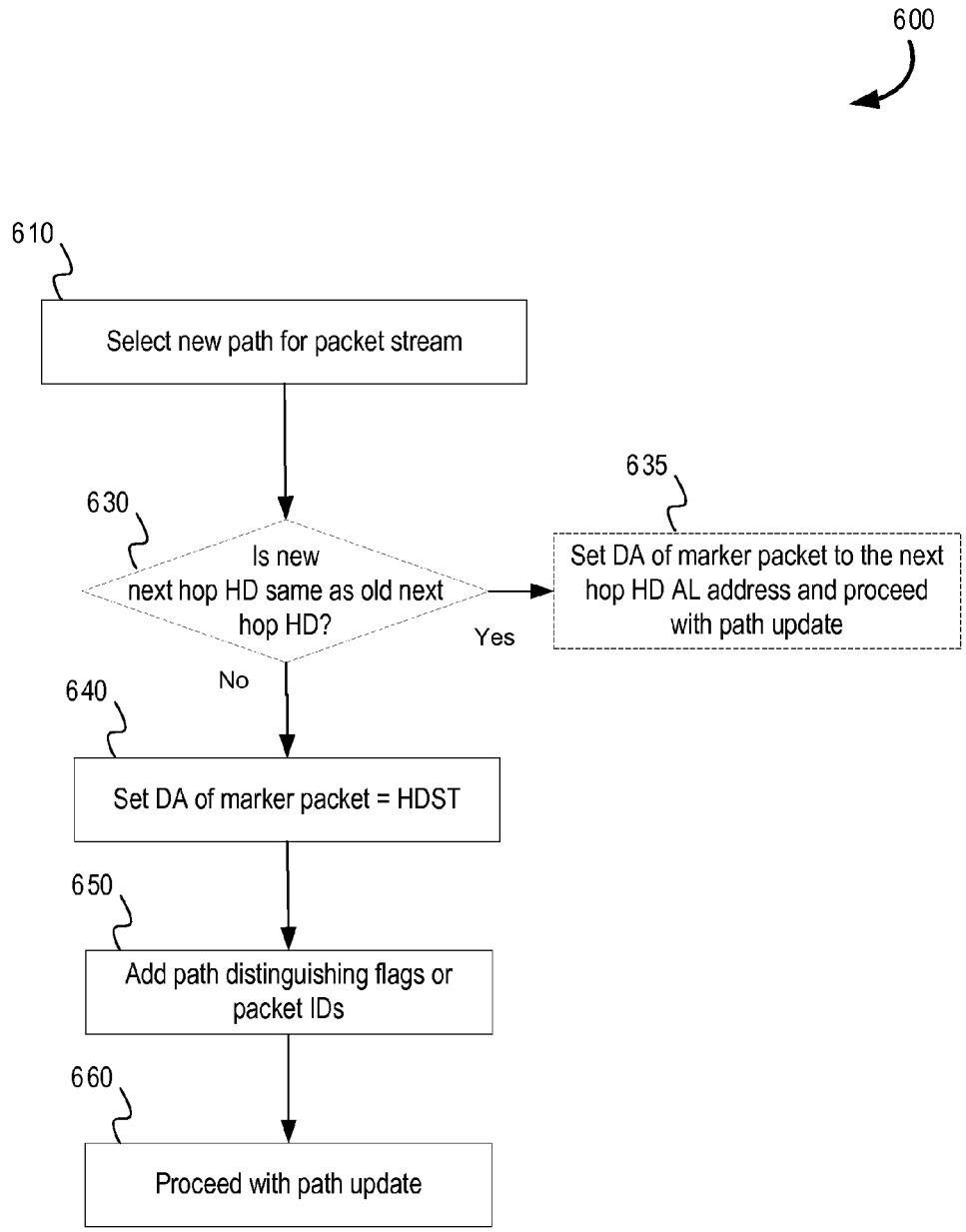
FIG. 6 is a flow diagram illustrating example operations for sending a path switch marker packet pursuant to a path update in a multi-hop hybrid network.

FIG. 6 is a flow diagram 600 illustrating example operations for sending a path switch marker packet pursuant to a path update in a multi-hop hybrid network. At 610 the hybrid device (for example a source hybrid device or a relay hybrid device) may select a new path for the packet stream. At 630, the hybrid device may determine if the hybrid device associated with the next hop of the new path (referred to as "new next hop") is the same hybrid device as the next hop associated with the old path (referred to as "old next hop"). For the implementation where a relay hybrid device performs packet reordering, it should be noted that the target interface for the new next hop does not need to be the same target interface as the old next hop. Instead, if the new next hop and the old next hop are different interfaces of the same next hop hybrid device, then it is possible that the next hop hybrid device is a relay hybrid device that is in the old path and the new path. In this case, it may be preferable to have the relay hybrid device perform packet reordering before forwarding the stream to the destination hybrid device. If the decision at 630 indicates that the new next hop HD is the same as the old next hop HD, then at block 635, the destination address of the stream marker packets are set to the next hop hybrid device. In that case, the next hop hybrid device will receive and process the stream marker packets.

If the new next hop HD is not the same as the old next hop HD, or if optional features 630, 635 are not implemented, then the process continues at block 640. At 640, the destination address of the stream marker packets is set as the destination hybrid device, regardless of whether there are one or more relay hybrid devices in the paths. To aid the destination hybrid device in distinguishing packets of the new path from packets of the old path, at 650 the hybrid device may add path distinguishing flags, modified stream marker packets, or other path distinguishing techniques (such as those described in FIG. 5). At 660, the hybrid device proceeds with the path update.

Figure 7:
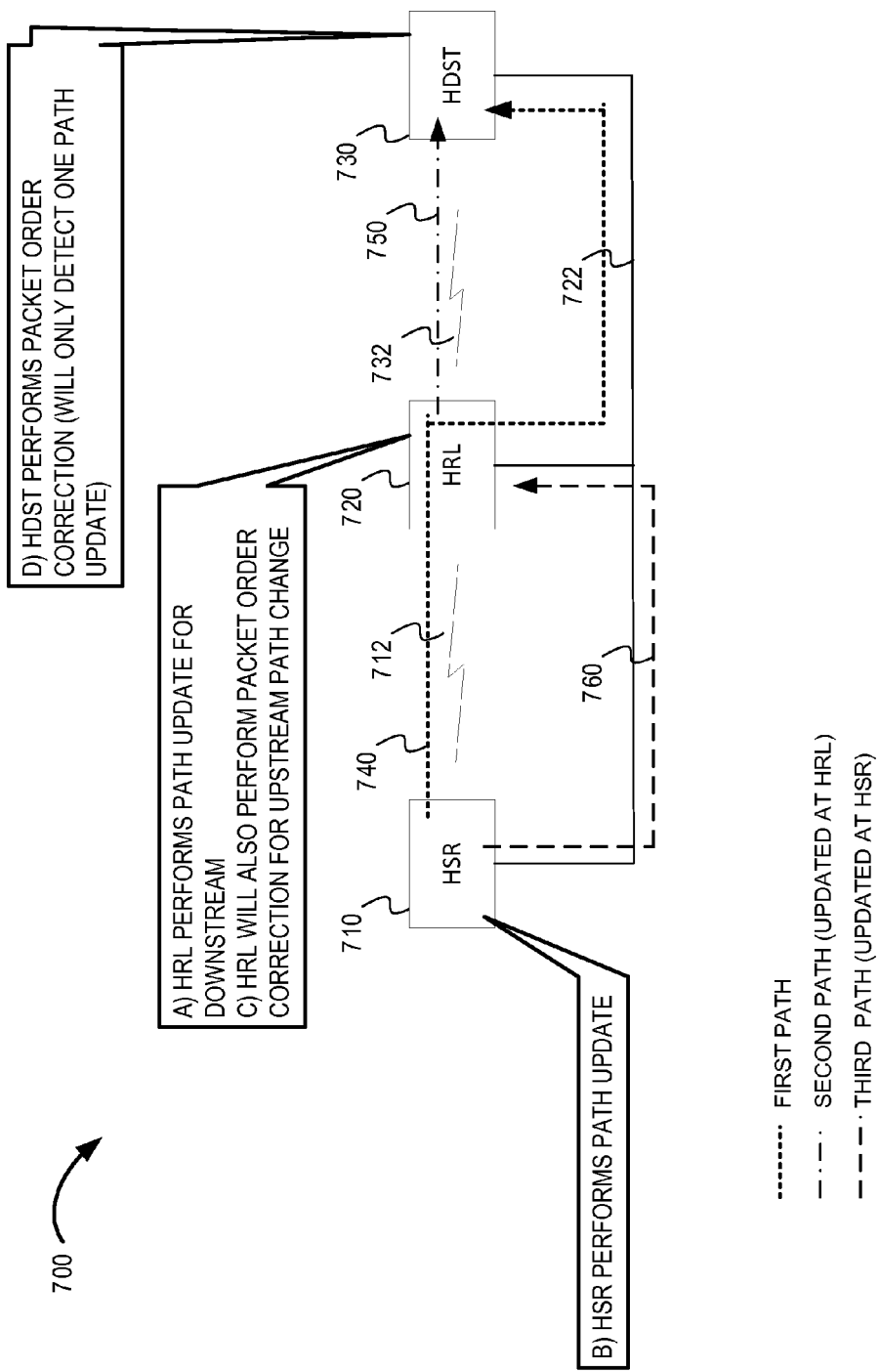
FIG. 7 is an example system diagram illustrating multiple path updates in a multi-hop hybrid network.

FIG. 7 is an example system diagram illustrating multiple path updates in a multi-hop hybrid network. In FIG. 7, there are two path update procedures performed—one path update occurs at source hybrid device (HSR) 710 and another path update procedure is performed at relay hybrid device (HRL) 720. Similar to previous figures, the HSR 710, HRL 720, and destination hybrid device (HDST) 730 are connected to a network 722. There is a wireless connection 712 between HSR 710 and HRL 720, as well as a wireless connection 732 between HRL 720 and HDST 730.

Initially a first path 740 is a two hop path from HSR 710 via wireless connection 712 to HRL 720, then from HRL 720 via network 722 to HDST 730. At stage A, the HRL 720 performs a path update procedure resulting in a second path 750 that includes wireless connection 712 for the first hop and wireless connection 732 for the second hop. At stage B, the HSR 710 also performs a path update procedure resulting in a third path 760 that includes network 722 for a first hop to HRL 720 and wireless connection 732 for a second hop to HDST 730.

In one implementation (such as depicted in FIG. 7), the HRL 720 may be configured to perform packet reordering. At stage C, the HRL 720 handles packet order correction for the change from the first path 740 to the third path 760 that was initiated by the HSR 710. This is because the same HRL 720 is in both paths and the stream marker packet may be addressed to the HRL 720. At stage D, the HDST 730 will also perform packet order correction for the change from the first path 740 to the second path 750. The stream marker packets associated this path update will be processed by the HDST 730. Therefore, in this embodiment, both the HRL 720 and HDST 730 will perform packet order correction for path updates occurring upstream at the HSR 710 and HRL 720, respectively.

In another implementation, the HRL 720 is not configured to perform packet reordering. In this scenario, the HDST 730 may receive two pairs of stream marker packets (two each of an end-of-stream marker packet and a beginning-of-stream marker packet). The HDST 730 may utilize additional information in the stream marker packets or path identifiers in the packets for each of the plurality of paths in order to properly reorder the incoming packets. The HDST 730 will reorder packets based on the HRL 720 path update first, and then reorder packets based on the path update at the HSR 710.

Figure 8:
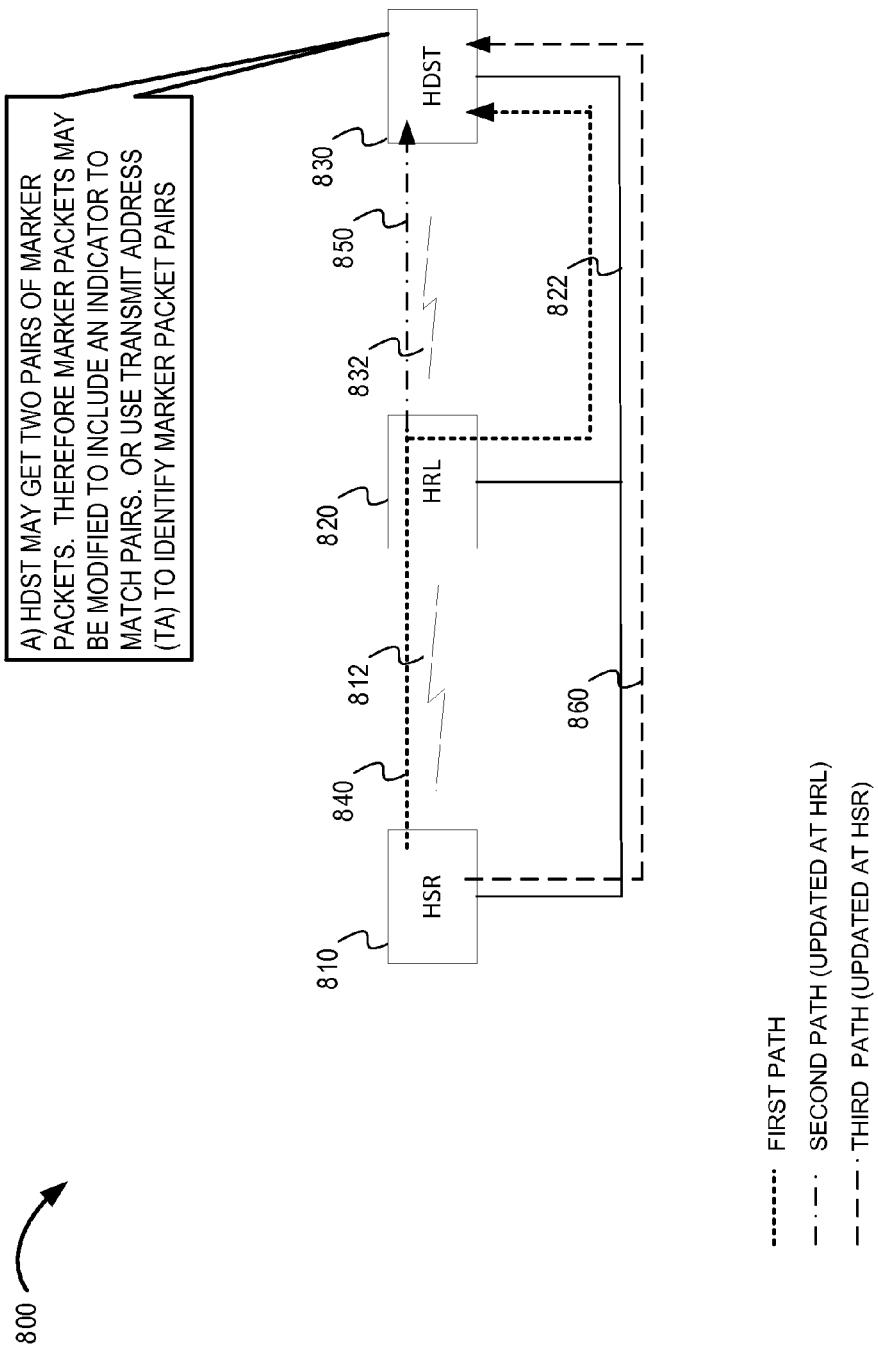
FIG. 8 is another example system diagram illustrating multiple path updates in a multi-hop hybrid network.

FIG. 8 is another example system diagram illustrating multiple path updates in a multi-hop hybrid network. In FIG. 8, there are two path update procedures performed—one path update occurs at source hybrid device (HSR) 810 and another path update procedure is performed at relay hybrid device (HRL) 820. Similar to previous figures, the HSR 810, HRL 820, and destination hybrid device (HDST) 830 are connected to a network 822. There is a wireless connection 812 between HSR 810 and HRL 820, as well as a wireless connection 832 between HRL 820 and HDST 830.

Initially a first path 840 is a two hop path from HSR 810 via wireless connection 812 to HRL 820, then from HRL 820 via network 822 to HDST 830. The HRL 820 performs a path update procedure resulting in a second path 850 that includes wireless connection 812 for the first hop and wireless connection 832 for the second hop. The HSR 810 also performs a path update procedure resulting in a third path 860 that includes network 822 for a one-hop path directly from the HSR 810 to HDST 830.

In this scenario, the HDST 830 will receive two pairs of stream marker packets (two each of an end-of-stream marker packet and a beginning-of-stream marker packet). The HDST 830 may require additional information in the stream marker packets or path identifiers in the packets for each of the plurality of paths in order to properly reorder the incoming packets. The HDST 830 will reorder packets based on the HRL 820 path update first, and then reorder packets based on the path update at the HSR 810.

It should be understood that FIGS. 1-8 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
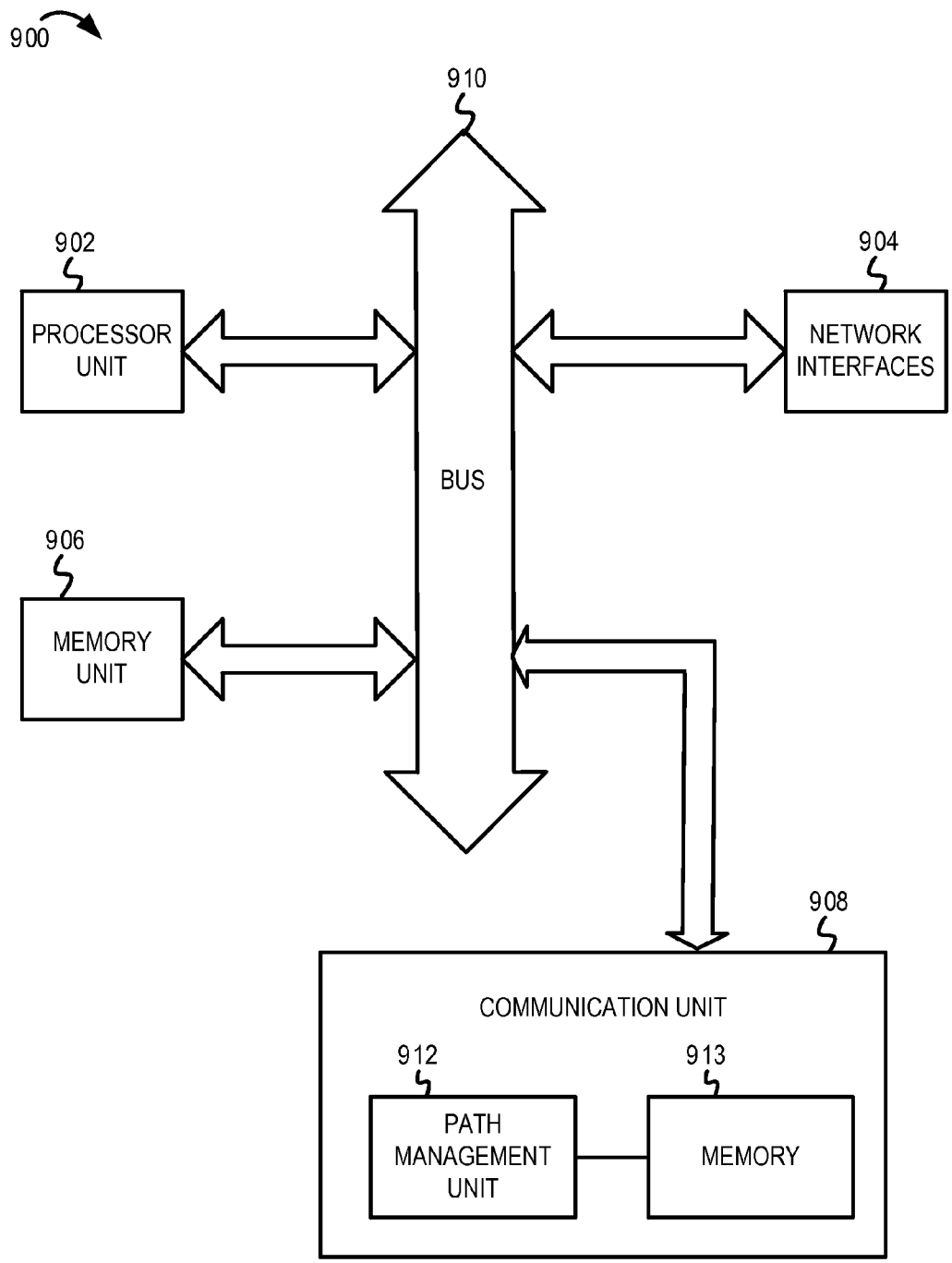
FIG. 9 is an example block diagram of one embodiment of an electronic device including a communication unit for packet stream path management in a multi-hop hybrid network.

FIG. 9 is an example block diagram of one embodiment of an electronic device 900 including a communication unit for seamless path switching in a hybrid network. In some implementations, the electronic device 900 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 900 includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, InfiniBand®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) or a wired network interface (e.g., an Ethernet interface, a powerline communication interface, etc.). In some implementations, the electronic device 900 may support multiple network interfaces—each of which is configured to couple the electronic device 900 to a different communication network.

The electronic device 900 also includes a communication unit 908. The communication unit 908 comprises a path management unit 912 and memory 913. It should be understood, that in some embodiments, the communication unit 908 may also have a dedicated processor (e.g., such as a communication unit comprising a system on a chip, or board with multiple chips, or multiple boards, in which the communication may have one or more dedicated processor or processing unit(s), in addition to the main processor unit 902). As described above in FIGS. 1-8, the path management unit 912 may implement functionality to select a path update, create stream marker packets, modify packets of a stream, or other example operations in a hybrid device for managing a packet stream through a transition from a first path to a second path. On a receiving hybrid device, the path management unit 912 may implement functionality to inspect stream marker packets, distinguish incoming packets as belonging to one of a new path or an old path, buffer (e.g. in memory 913) incoming packets associated with the new path until remaining packets of the old path are processed. Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the memory unit 906, and the network interfaces 904 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, seamless path switching as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for path switching in a network, the method comprising:

receiving, at an interface of a first device in the network, a plurality of packets from a second device;

determining that a first packet of the plurality of packets is associated with a first path used before a path update and that a second packet of the plurality of packets is associated with a second path used after the path update; and processing the first packet and the second packet in an order based, at least in part, on the first packet being associated with the first path and the second packet being associated with the second path.

2. The method of claim 1, wherein the second packet is received before the first packet, and said processing comprises buffering the second packet until the first packet is processed.

3. The method of claim 1, wherein said processing is performed at a lower layer of a protocol stack than a transport layer.

4. The method of claim 1, wherein said processing comprises:

receiving a beginning-of-stream marker packet associated with the second path; and in response to receiving the beginning-of-stream marker packet, buffering the second packet until the first packet has been processed.

5. The method of claim 4, wherein said processing further comprises:

receiving an end-of-stream marker packet associated with the first path; and determining that the first packet has been processed based, at least in part, on receiving the end-of-stream marker packet.

6. The method of claim 4, wherein said buffering comprises buffering the second packet until an expiration of a buffer timeout time period.

7. The method of claim 1, wherein said determining that the second packet is associated with the second path comprises:

determining that a new path flag is included in the second packet, the new path flag indicative of the second path.

8. The method of claim 1, wherein said determining that the first packet is associated with the first path and the second packet is associated with the second path comprises:

determining that a marker packet, received by the first device from the second device, identifies the first packet as associated with the first path and transmitted from the second device prior to the path update.

9. The method of claim 8, wherein the marker packet identifies the first packet with at least one member selected from the group consisting of a packet checksum, a packet identifier, and a packet sequence number.

10. The method of claim 1, wherein determining that the first packet is associated with the first path comprises determining that the first packet comprises a first medium access control protocol data unit that indicates a first transmit address indicative of the first path, and wherein determining that the second packet is associated with the second path comprises determining that the second packet comprises a second medium access control protocol data unit that indicates a second transmit address indicative of the second path.

11. A method for communicating via a network, the method comprising:

transmitting, via a first path of the network from a first device to a second device, a first packet of a plurality of packets;

selecting a second path of the network from the first device to the second device, the second path to replace the first path;

transmitting, after transmitting the first packet via the first path, an end-of-stream marker packet via the first path, the end-of-stream marker packet indicative that the first path is being replaced;

transmitting, via the second path, a beginning-of-stream marker packet prior to transmitting a second packet of the plurality of packets; and transmitting, via the second path, the second packet.

12. The method of claim 11, wherein the first path and the second path are different paths through the network that arrive at a same interface of the second device.

13. The method of claim 11, further comprising:
setting a destination address for the end-of-stream marker packet and the beginning-of-stream marker packet to an address of a relay device, in response to a determination that the relay device is in both the first path and the second path.

14. The method of claim 11, further comprising setting a path switch flag in the second packet.

15. The method of claim 11, further comprising including a path switch flag in the second packet.

16. The method of claim 11, further comprising including a path switch flag in each of a configurable number of packets transmitted via the second path.

17. The method of claim 11, further comprising:
transmitting a marker packet to the second device, wherein the marker packet includes packet identification information that identifies at least the first packet that was transmitted by the first device prior to replacement of the first path with the second path.

18. The method of claim 17, wherein the packet identification information comprises at least one member selected from the group consisting of a packet checksum, a packet identifier, and a packet sequence number.

19. An apparatus for path switching in a network, the apparatus comprising:
a processor;
an interface configured to receive a plurality of packets via a network; and
memory having program instructions stored therein, the program instructions executable by the processor to cause the apparatus to,
determine which of a first path used before a path update and a second path used after the path update is associated with each of the plurality of packets received via the interface; and
process the plurality of packets in an order that is based, at least in part, on association with either the first path or the second path.

20. The apparatus of claim 19, wherein the program instructions are further executable by the processor to cause the apparatus to buffer a second packet, which is received before a first packet, until the first packet is processed based, at least in part, on a determination that the second packet is associated with the second path and the first packet is associated with the first path, wherein the plurality of packets comprises the first packet and the second packet.

21. The apparatus of claim 19, wherein the program instructions are implemented at a lower layer of a protocol stack than a transport layer.

22. The apparatus of claim 19, wherein the program instructions are further executable by the processor to cause the apparatus to:
receive a beginning-of-stream marker packet associated with the second path; and
responsive to receipt of the beginning-of-stream marker packet, buffer a second packet associated with the second path until a first packet associated with the first path has been processed, wherein the plurality of packets comprises the first packet and the second packet.

23. The apparatus of claim 19, wherein the program instructions are further executable by the processor to cause the apparatus to:
determine that a first packet associated with the first path has been processed after receipt of an end-of-stream market packet associated with the first path, wherein the plurality of packets comprises the first packet.

24. The apparatus of claim 19, wherein the program instructions are further executable by the processor to cause the apparatus to buffer a first packet associated with the second path until an expiration of a predetermined buffer timeout time period, wherein the plurality of packets comprises the first packet.

25. The apparatus of claim 19, wherein the program instructions that cause the apparatus to determine which of the first path and the second path is associated with each of the plurality of packets comprises program instructions to cause the apparatus to determine which of the plurality of packets includes a new path flag, the new path flag indicative of the second path.

26. The apparatus of claim 19, wherein the program instructions that cause the apparatus to determine which of the first path and the second path is associated with each of the plurality of packets comprises program instructions to cause the apparatus to:
determine that a marker packet, received by the apparatus via the interface, includes packet identification information that identifies at least a first packet associated with the first path that was transmitted by a source device prior to the path update from the first path to the second path, wherein the plurality of packets comprises the first packet.

27. The apparatus of claim 26, wherein the packet identification information comprises at least one member selected from the group consisting of a packet checksum, a packet identifier, a packet sequence number, and a result of a calculation using at least one of the plurality of packets as a variable input.

28. The apparatus of claim 19, wherein the program instructions that cause the apparatus to determine which of the first path and the second path is associated with each of the plurality of packets comprises program instructions to cause the apparatus to:
determine which of a first media access control transmit address and a second media access control transmit address is indicated in each of the plurality of packets, wherein the first media access control transmit address corresponds to the first path and the second media access control transmit address corresponds to the second path.

* * * * *